US011402076B1

(12) United States Patent
Travis et al.

(10) Patent No.: US 11,402,076 B1
(45) Date of Patent: Aug. 2, 2022

(54) SAFETY STROBE LIGHT HOLDER WITH AN ATTACHMENT AND REMOVAL TOOL

(71) Applicants: Timothy Travis, Pompano, FL (US); Brian Travis, Pompano, FL (US)

(72) Inventors: Timothy Travis, Pompano, FL (US); Brian Travis, Pompano, FL (US)

( * ) Notice: Subject to any disclaimer, the term of this patent is extended or adjusted under 35 U.S.C. 154(b) by 0 days.

(21) Appl. No.: 17/345,474

(22) Filed: Jun. 11, 2021

(51) Int. Cl.
*F21S 43/19* (2018.01)
*F21V 21/096* (2006.01)
*F21Y 115/10* (2016.01)
*F21W 107/10* (2018.01)

(52) U.S. Cl.
CPC ............ *F21S 43/19* (2018.01); *F21V 21/096* (2013.01); *F21W 2107/10* (2018.01); *F21Y 2115/10* (2016.08)

(58) Field of Classification Search
CPC ........ F21S 43/19; F21V 21/096; F21V 19/04; F21W 2107/10; F21Y 2155/10
See application file for complete search history.

(56) References Cited

U.S. PATENT DOCUMENTS

| 4,903,174 A | 2/1990 | Busby |
| 6,552,658 B1 | 4/2003 | Roller et al. |
| 7,095,334 B2 | 8/2006 | Pederson |
| 9,132,770 B2 | 9/2015 | Amsley et al. |
| 10,071,678 B2 | 9/2018 | Luminet et al. |
| 10,684,001 B1* | 6/2020 | Beckman ................ F21V 23/06 |
| 2014/0169013 A1* | 6/2014 | Naumann ............. B60Q 1/305 362/485 |
| 2018/0017241 A1* | 1/2018 | Grider ....................... F21L 4/08 |

* cited by examiner

*Primary Examiner* — Britt D Hanley
(74) *Attorney, Agent, or Firm* — The Rapacke Law Group, P.A.

(57) ABSTRACT

A safety strobe light may include a modular design incorporating a body portion, a removable lamp or LED, and a removable means for attachment of the safety strobe light to a boom truck arm. The body portion may be constructed and arranged to house at least a portion of the lamp and means for attachment. The body portion may define a channel constructed and arranged to temporarily and removably attach to an attachment and removal tool attached to a hot stick or similar extension pole. The attachment and removal tool may be constructed and arranged to engage with the channel defined by the body portion, such that safety strobe lights may be attached to and removed from surfaces and objects (such as a boom truck arm).

20 Claims, 4 Drawing Sheets

SAFETY STROBE LIGHT HOLDER WITH AN ATTACHMENT AND REMOVAL TOOL

TECHNICAL FIELD

The embodiments generally relate to attachable and removable safety lights and tools therefor.

BACKGROUND

Lights, lamps, and various means of increasing visibility on work vehicles, such as boom trucks or bucket trucks, typically include large flood lights that may unnecessarily illuminate large areas and may distract nearby vehicles despite only a need for local illumination. Workers in the bucket of a bucket truck may only need local illumination during night work, low light work, or during bad weather work. During daytime activities, workers may need only illumination sufficient to serve as warning lights to those nearby or below a bucket truck.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

A safety strobe light as per particular embodiments of the present disclosure may include a modular design incorporating a body portion, a removable lamp or Light Emitting Diode (LED) bulb, and an attachment means (such as, for example, a magnet, and the like) for attachment to a boom truck arm. The body portion may be constructed and arranged to receive and house at least a portion of the lamp and means for attachment. The body portion may define a channel constructed and arranged to be temporarily and removably attached to an attachment and removal tool, which may be attached to a hot stick or similar extension pole.

In use, a worker may use a hot stick or extension pole that includes an attachment and removal tool on the end of the extension pole, the attachment and removal tool being constructed and arranged to temporarily hold the body portion of the safety strobe light wherein the attachment and removal tool engages with the channel defined by the body portion. A worker may slot the safety strobe light within a recess defined by the attachment and removal tool such that the safety strobe light is secured within the tool temporarily. A worker may use the extension pole to affix the safety strobe light to a portion of a boom truck, and in particular, the knuckle of the boom arm of a boom truck. The attachment means on the safety strobe light may secure the safety strobe light to the portion of the boom truck. A worker may slide the safety strobe light from the recess defined by the attachment and removal tool such that the safety strobe light is securely mounted on a portion of the boom truck.

Other illustrative variations within the scope of the disclosure will become apparent from the detailed description provided hereinafter. The detailed description and enumerated variations, while disclosing optional variations, are intended for purposes of illustration only and are not intended to limit the scope of the disclosure.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
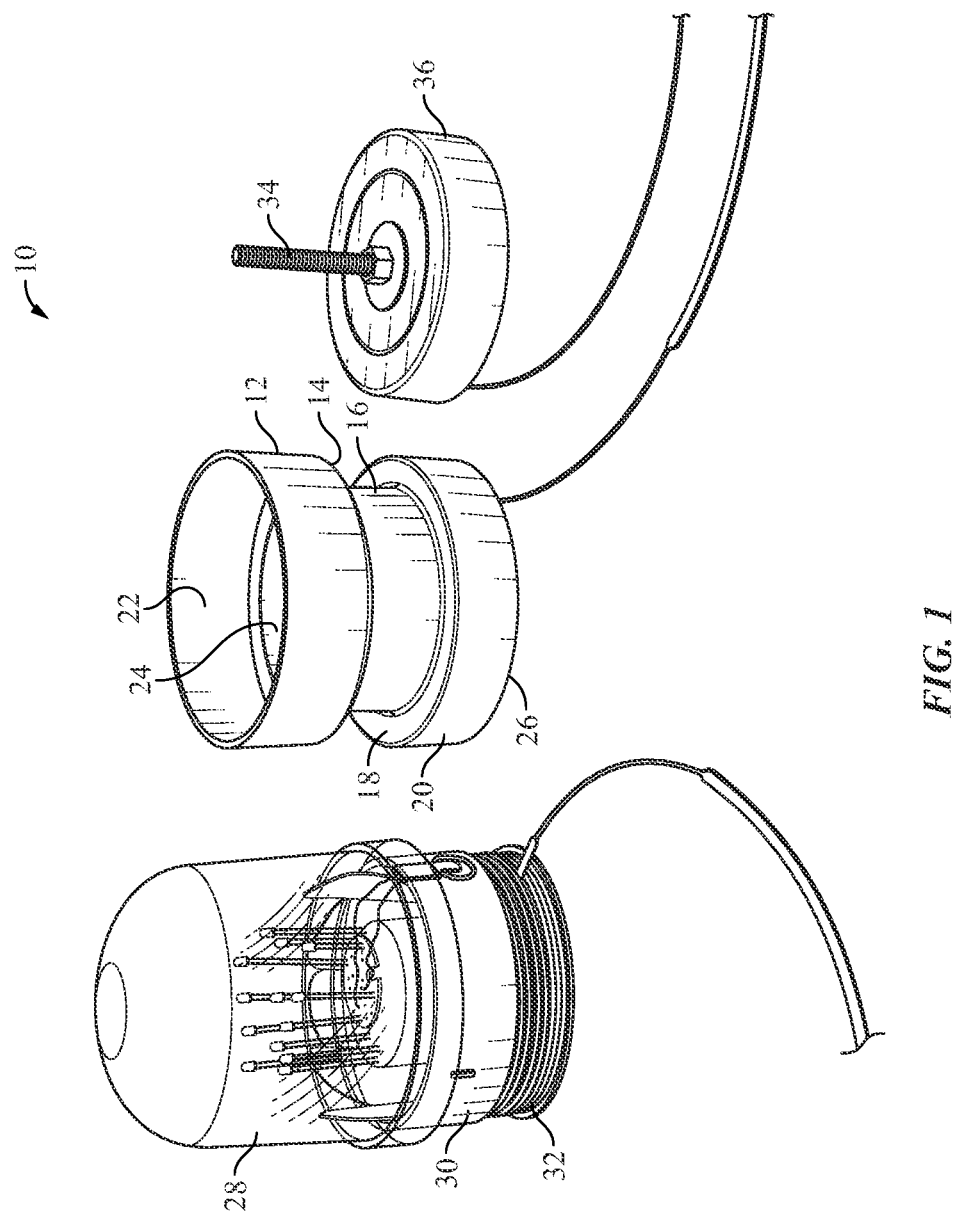
FIG. 1 illustrates a view of a disassembled safety strobe light according to some variations described herein.

The specific details of the single embodiment or variety of embodiments described herein are to the described system and methods of use. Any specific details of the embodiments are used for demonstration purposes only and no unnecessary limitations or inferences are to be understood from there.

It is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The scope of the disclosure will be best understood by the following description of figures.

FIG. 1 depicts one variation of a disassembled safety strobe light 10 including a body portion 12, an attachment base 36, and a lamp 28. The body portion 12 may include an upper neck 22 opposite a lower neck 20 and defining a channel 16 therebetween. The upper neck 22, lower neck 20, and channel 16 may define an upper flange 14 and a lower flange 18. The channel 16 may encircle the body portion 12. The upper neck 22 may define in approximately cylindrical shape a lamp recess 24 constructed and arranged to receive and connect to at least a portion of the lamp 28. The lower neck 20 may define an attachment base recess 26 constructed and arranged to receive at least a portion of the attachment base 36. The cylindrical lamp recess 24 and attachment base recess 26 may be the same recess in some embodiments. The lamp 28 may include a lamp base 30 and a threaded lamp base 32 constructed and arranged to mechanically thread and connect with the cylindrical lamp recess 24. Additionally, the threaded lamp base 32 may be constructed and arranged to mechanically connect with a threaded stem 34 of the attachment base 36 wherein the threaded stem 34 passes through a portion of the cylindrical lamp recess 24 and attachment base recess 26. The attachment base 36 may include a means for attaching the safety strobe light to a boom truck arm such as a magnet, adhesive, or the like and which will be described in greater detail in the following figures.

Figure 2:
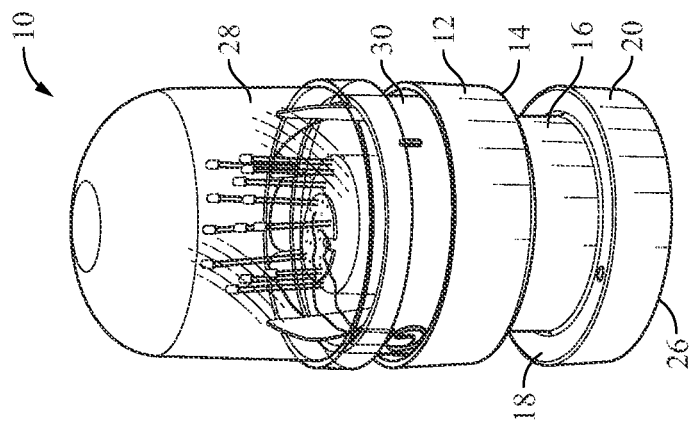
FIG. 2 illustrates a view of a variety of safety strobe lights according to some variations described herein.
Figure 2:
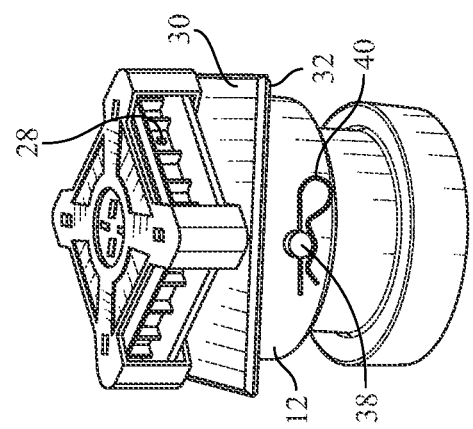
Figure 2:
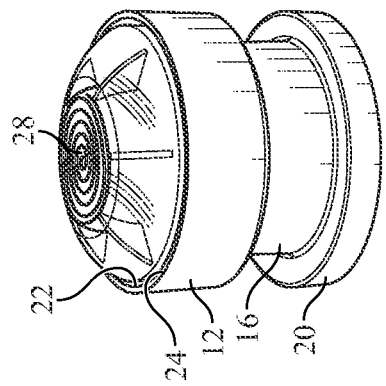

FIG. 2 illustrates a view of a variety of safety strobe lights, each safety strobe light 10 including a body portion 12, a channel 16, and upper neck 22 opposite a lower neck 20, an upper flange 14 and a lower flange 18. For ease of discussion, the same reference numeral "10" is used herein to refer to each variation of a safety strobe light as per teachings of the present disclosure. It is noted that, for ease of illustration, in the assembled versions of the safety strobe lights in FIG. 2, each part may not be identified with a reference numeral for each strobe light shown therein. As depicted in FIG. 1, the lamp 28 may be connected to the body portion by means of threading the lamp with the body or magnetically. Additionally, in some variations of the strobe light, the lamp 28 may include a lamp base 30 affixed to the body portion via a pin 38 and hitch pin 40 wherein the pin 38 passes through a portion of the upper neck 22 and the lamp base 30 such that the pin 38 holds the lamp 28 to the body 12. Additionally, in some variations of the strobe light, the lamp 28 may be affixed to the body portion 12 by means of adhesive, magnet, or the like.

Figure 4:
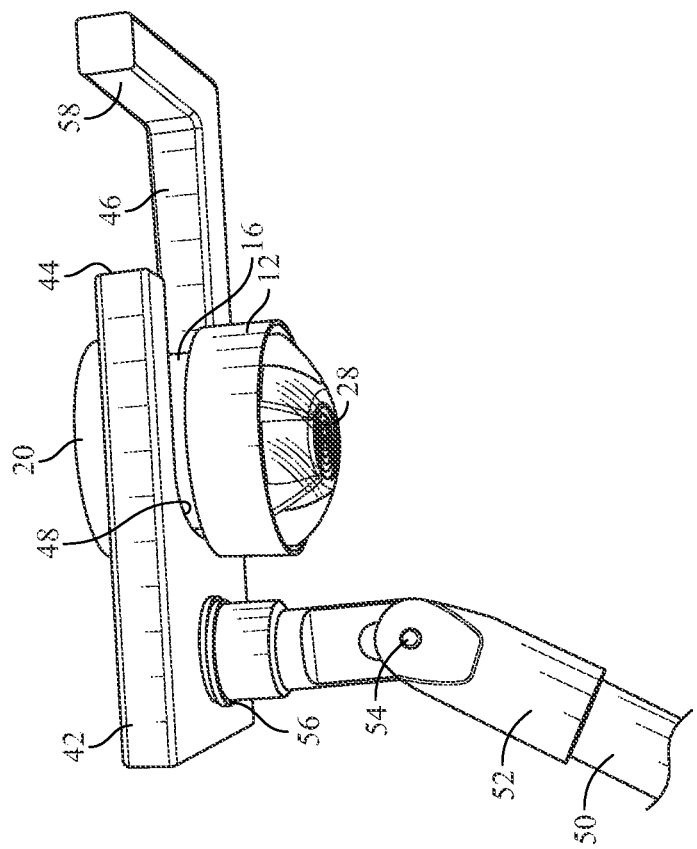
FIG. 4 illustrates a view of an attachment and removal tool according to some variations described herein.
Figure 3:
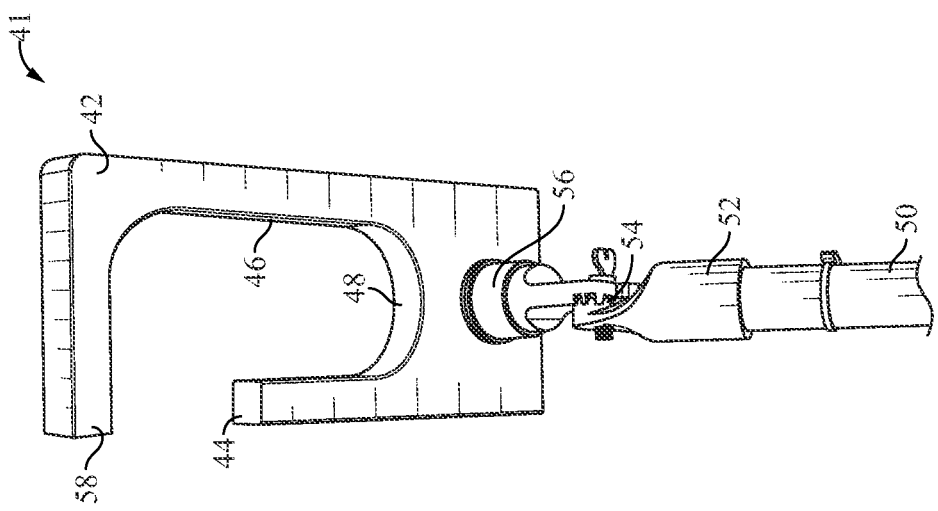
FIG. 3 illustrates a view of an attachment and removal tool according to some variations described herein.
Figure 5:
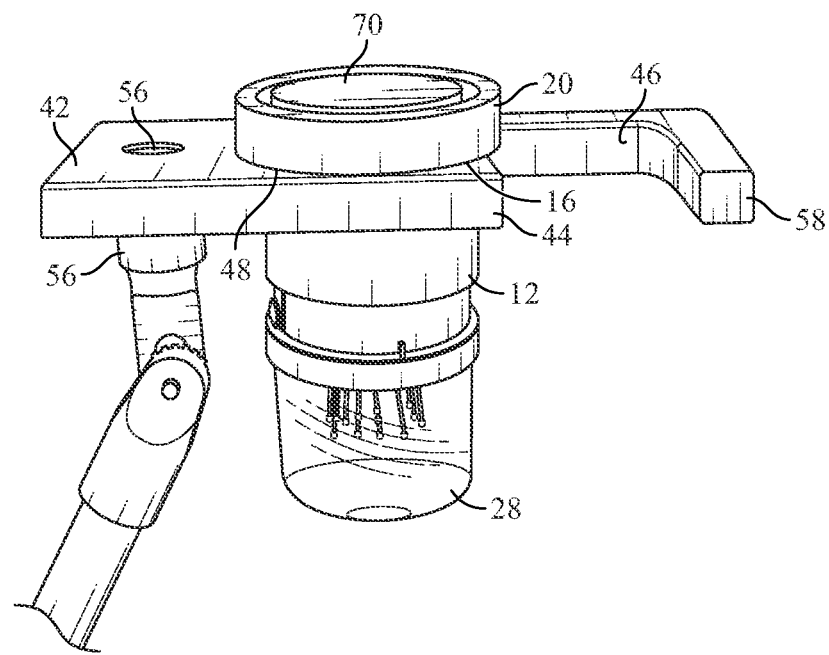
FIG. 5 illustrates a view of a safety strobe light seated within an attachment and removal tool according to some variations described herein.

FIG. 3-4 illustrate different views of an attachment and removal tool 41 as per some embodiments of the present disclosure, and FIGS. 4-5 illustrate views of different safety strobe lights seated within the attachment and removal tool 41. FIGS. 3-5 depict variations of an attachment and removal tool 41 that may include a generally rectangular tool body 42. While being depicted as generally rectangular, the tool body 42 may be of a variety of shapes including, but not limited to, an oval, a circle, a triangle, or the like. The tool body 42 may include a first arm 58 and a second arm 44 extending therefrom and in combination with the tool body 42, defining a channel slot 46 and channel seat 48. The channel slot 46 may be constructed and arranged to receive the channel 16 of the safety strobe light and may be constructed and arranged to slide the safety strobe light into the channel seat 48 such that the safety strobe light is secured within the tool body 42. The attachment and removal tool 41 may further include a pivoting neck 52 including a neck locking mechanism 54 constructed and arranged to allow the attachment and removal tool to lockingly pivot on a hot stick 50 or pole. The pivoting neck 52 may be secured to the tool body 42 via a threaded connection 56.

As seen in FIG. 4, in one variation, a safety strobe light may be seated within the attachment and removal tool 41 such that the channel 16 may slidably pass between the first arm 58 and the second arm 44 and within the channel slot 46 and channel seat 48 defined by the tool body 42 of the attachment and removal tool 41.

FIG. 5 depicts a variation of a safety strobe light and attachment and removal tool as previously described wherein the safety strobe light may include an attachment means 70 seated within the attachment base of the lower neck 20. The attachment means 70 may be a magnet, a plurality of magnets, suction cups, adhesives, or the like.

Figure 6:
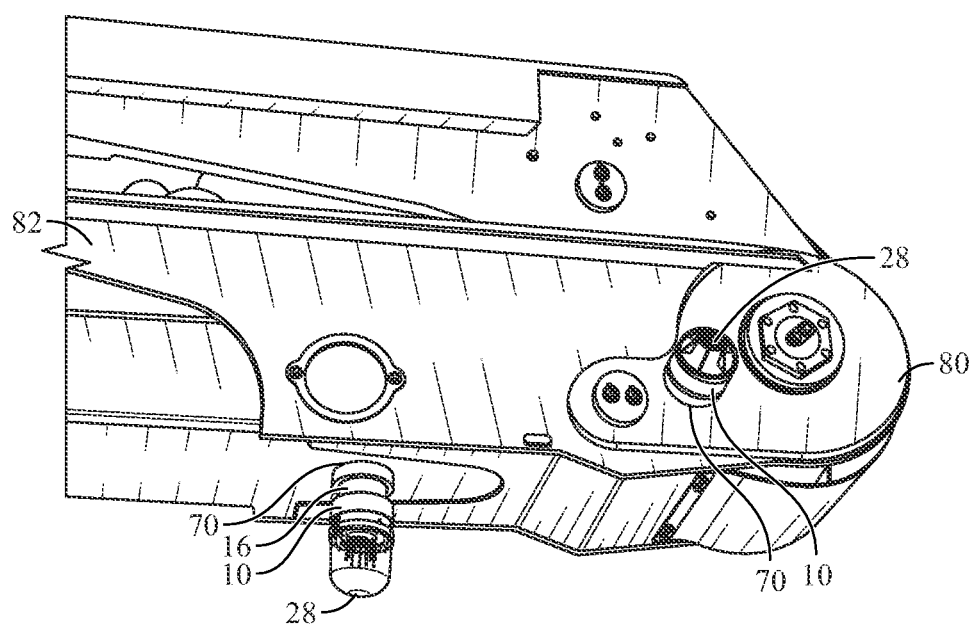
FIG. 6 illustrates a view of a safety strobe light securely mounted to a boom truck according to some variations described herein.

FIG. 6 illustrates a view of a safety strobe light 10 securely mounted to a boom truck (only the boom arm portion of which is shown). FIG. 6 depicts two safety strobe lights 10 each including a lamp 28, wherein each safety strobe light 10 has been removably attached to a knuckle 80 of a boom arm 82 of the boom truck via the attachment means 70.

In use, a user may use the earlier-discussed hot stick or extension pole including an attachment and removal tool on the end of the extension pole, the attachment and removal tool being constructed and arranged to temporarily hold the safety strobe light wherein the attachment and removal tool engages with the channel defined by the body portion of the strobe light. A user may slot the safety strobe light within the channel slot and channel seat defined by the attachment and removal tool such that the safety strobe light is secured within the tool temporarily. A user may use the extension pole to affix the safety strobe light to a portion of a boom truck, and in particular, the knuckle of the boom arm of a boom truck. The attachment means on the safety strobe light may secure the safety strobe light to the portion of the boom truck. A user may slide the safety strobe light from the channel slot and channel seat defined by the attachment and removal tool such that the safety strobe light is securely mounted on a portion of the boom truck. Similarly, a user may remove a safety strobe light from an object or surface via a hot stick or extension pole including an attachment and removal tool as described herein. The attachment and removal tool may slightly engage the channel of the safety strobe light such that the safety strobe light is seated within the channel seat of the attachment and removal tool and the safety strobe light may be removed from the object or surface by pulling on the attachment and removal tool via the extension pole.

The following description of variants is only illustrative of components, elements, acts, products, and methods considered to be within the scope of the disclosure and are not in any way intended to limit such scope by what is specifically disclosed or not expressly set forth. The components, elements, acts, products, and methods as described herein may be combined and rearranged other than as expressly described herein and are still considered to be within the scope of the disclosure.

According to variation 1, a modular safety strobe light and attachment and removal tool may include a safety strobe light including a lamp and a lamp base, an attachment base including an attachment means and a body portion that includes an upper neck opposite a lower neck, an upper flange opposite a lower flange, and defines a channel between the upper flange and lower flange, the channel encircling the body portion. The upper neck defines a lamp recess constructed and arranged to receive and connect to the lamp base. The lower neck defines an attachment base recess constructed and arranged to receive at least a portion of the attachment base. An attachment and removal tool may include a tool body that may include a first arm and a second arm extending therefrom, the tool body defining a channel slot and channel seat, and wherein the channel slot and channel seat are constructed and arranged to slidably receive the channel defined by the body portion such that the safety strobe light may be removably secured within the tool body.

Variation 2 may include a modular safety strobe light and attachment and removal tool as in variation 1, wherein the lamp base is connected to the lamp recess via a pin and a hitch pin.

Variation 3 may include a modular safety strobe light and attachment and removal tool as in any of variations 1 through 2, wherein the lamp recess and the attachment base recess form a continuous pass-through recess within the body portion.

Variation 4 may include a modular safety strobe light and attachment and removal tool as in any of variations 1 through 3, wherein the attachment base is constructed and arranged to attach to the lamp base through the continuous pass-through recess within the body portion.

Variation 5 may include a modular safety strobe light and attachment and removal tool as in any of variations 1 through 4, wherein the lamp base is constructed and arranged to threadingly mate with the lamp recess.

Variation 6 may include a modular safety strobe light and attachment and removal tool as in any of variations 1 through 5, wherein the attachment base is constructed and arranged to threadingly mate with the attachment base recess.

Variation 7 may include a modular safety strobe light and attachment and removal tool as in any of variations 1 through 6, wherein the body portion is magnetic.

Variation 8 may include a modular safety strobe light and attachment and removal tool as in any of variations 1 through 7, wherein the lamp base is constructed and arranged to magnetically mate with the lamp recess.

Variation 9 may include a modular safety strobe light and attachment and removal tool as in any of variations 1 through 8, wherein the attachment base is constructed and arranged to magnetically mate with the attachment base recess.

Variation 10 may include a modular safety strobe light and attachment and removal tool as in any of variations 1 through 9, wherein the attachment and removal tool further includes a pivoting neck constructed and arranged to attach the attachment and removal tool to a pole.

According to variation 11, a modular safety strobe light and attachment and removal tool may include a safety strobe light including a lamp and a lamp base, an attachment base including an attachment means, a magnetic body portion including an upper neck opposite a lower neck, an upper flange opposite a lower flange, and defining a channel between the upper flange and lower flange, the channel encircling the body portion. Wherein the upper neck defines a lamp recess constructed and arranged to receive and magnetically connect to the lamp base and the lower neck defines an attachment base recess constructed and arranged to receive and magnetically connect to at least a portion of the attachment base. An attachment and removal tool including a tool body that may include a first arm and a second arm extending therefrom, the tool body, first arm, and second arm defining a channel slot and channel seat, and wherein the channel slot and channel seat are constructed and arranged to slidably receive the channel defined by the body portion such that the safety strobe light may be removably secured within the tool body.

Variation 12 may include a modular safety strobe light and attachment and removal tool as in variation 11, wherein the lamp base is connected to the lamp recess via a pin and a hitch pin.

Variation 13 may include a modular safety strobe light and attachment and removal tool as in any of variations 11 through 12, wherein the lamp recess and the attachment base recess form a continuous pass-through recess within the body portion.

Variation 14 may include a modular safety strobe light and attachment and removal tool as in any of variations 11 through 13, wherein the attachment base is constructed and arranged to attach to the lamp base through the continuous pass-through recess within the body portion.

Variation 15 may include a modular safety strobe light and attachment and removal tool as in any of variations 11 through 14, wherein the lamp base is constructed and arranged to threadingly mate with the lamp recess.

Variation 16 may include a modular safety strobe light and attachment and removal tool as in any of variations 11 through 15, wherein the attachment base is constructed and arranged to threadingly mate with the attachment base recess.

Variation 17 may include a modular safety strobe light and attachment and removal tool as in any of variations 11 through 16, wherein the attachment and removal tool further includes a pivoting neck constructed and arranged to attach the attachment and removal tool to a pole.

According to variation 18, a modular safety strobe light and attachment and removal tool may include a safety strobe light including a lamp and a lamp base; an attachment base including an attachment means; a magnetic body portion including an upper neck opposite a lower neck, an upper flange opposite a lower flange, and defining a channel between the upper flange and lower flange, the channel encircling the body portion; wherein the upper neck defines a lamp recess constructed and arranged to receive and magnetically connect to the lamp base; wherein the lower neck defines an attachment base recess constructed and arranged to receive and magnetically connect to at least a portion of the attachment base. An attachment and removal tool may include a tool body that may include a first arm and a second arm extending therefrom, the tool body, first arm, and second arm defining a channel slot and channel seat, and wherein the channel slot and channel seat are constructed and arranged to slidably receive the channel defined by the body portion such that the safety strobe light may be removably secured within the tool body and a pivoting neck attached to the tool body, the pivoting neck constructed and arranged to attach the attachment and removal tool to a pole.

Variation 19 may include a modular safety strobe light and attachment and removal tool as in variation 18, wherein the attachment base includes a magnet.

Variation 20 may include a modular safety strobe light and attachment and removal tool as in any of variations 18 through 19, wherein the lamp includes at least one light emitting diode (LED).

Many different embodiments have been disclosed herein, in connection with the above description and the drawing. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:
1. A modular safety strobe light and attachment and removal tool, comprising:
a safety strobe light comprising:
a lamp comprising a lamp base;
an attachment base comprising an attachment means;
a body portion that comprises an upper neck opposite a lower neck, and an upper flange opposite a lower flange, and defines a channel between the upper flange and lower flange, the channel encircling the body portion;

wherein the upper neck defines a lamp recess constructed and arranged to receive and connect to the lamp base;

wherein the lower neck defines an attachment base recess constructed and arranged to receive at least a portion of the attachment base; and an attachment and removal tool comprising a tool body that includes a first arm and a second arm extending therefrom, the tool body defining a channel slot and channel seat, and wherein the channel slot and channel seat are constructed and arranged to slidably receive the channel defined by the body portion such that the safety strobe light is removably secured within the tool body.

2. The modular safety strobe light and attachment and removal tool as in claim 1, wherein the lamp base is connected to the lamp recess via a pin and a hitch pin.

3. The modular safety strobe light and attachment and removal tool as in claim 1, wherein the lamp recess and the attachment base recess form a continuous pass-through recess within the body portion.

4. The modular safety strobe light and attachment and removal tool as in claim 3, wherein the attachment base is constructed and arranged to attach to the lamp base through the continuous pass-through recess within the body portion.

5. The modular safety strobe light and attachment and removal tool as in claim 1, wherein the lamp base is constructed and arranged to threadingly mate with the lamp recess.

6. The modular safety strobe light and attachment and removal tool as in claim 1, wherein the attachment base is constructed and arranged to threadingly mate with the attachment base recess.

7. The modular safety strobe light and attachment and removal tool as in claim 1, wherein the body portion is magnetic.

8. The modular safety strobe light and attachment and removal tool as in claim 7, wherein the lamp base is constructed and arranged to magnetically mate with the lamp recess.

9. The modular safety strobe light and attachment and removal tool as in claim 7, wherein the attachment base is constructed and arranged to magnetically mate with the attachment base recess.

10. The modular safety strobe light and attachment and removal tool as in claim 1, wherein the attachment and removal tool further comprises a pivoting neck constructed and arranged to attach the attachment and removal tool to a pole.

11. A modular safety strobe light and attachment and removal tool, comprising:

a safety strobe light comprising:
  a lamp comprising a lamp base;
  an attachment base comprising an attachment means;
  a magnetic body portion comprising an upper neck opposite a lower neck, an upper flange opposite a lower flange, and defining a channel between the upper flange and lower flange, the channel encircling the body portion;
    wherein the upper neck defines a lamp recess constructed and arranged to receive and magnetically connect to the lamp base;
    wherein the lower neck defines an attachment base recess constructed and arranged to receive and magnetically connect to at least a portion of the attachment base; and an attachment and removal tool comprising a tool body that includes a first arm and a second arm extending therefrom, the tool body, first arm, and second arm defining a channel slot and channel seat, and wherein the channel slot and channel seat are constructed and arranged to slidably receive the channel defined by the body portion such that the safety strobe light is removably secured within the tool body.

12. The modular safety strobe light and attachment and removal tool as in claim 11, wherein the lamp base is connected to the lamp recess via a pin and a hitch pin.

13. The modular safety strobe light and attachment and removal tool as in claim 11, wherein the lamp recess and the attachment base recess form a continuous pass-through recess within the body portion.

14. The modular safety strobe light and attachment and removal tool as in claim 13, wherein the attachment base is constructed and arranged to attach to the lamp base through the continuous pass-through recess within the body portion.

15. The modular safety strobe light and attachment and removal tool as in claim 11, wherein the lamp base is constructed and arranged to threadingly mate with the lamp recess.

16. The modular safety strobe light and attachment and removal tool as in claim 11, wherein the attachment base is constructed and arranged to threadingly mate with the attachment base recess.

17. The modular safety strobe light and attachment and removal tool as in claim 11, wherein the attachment and removal tool further comprises a pivoting neck constructed and arranged to attach the attachment and removal tool to a pole.

18. A modular safety strobe light and attachment and removal tool, comprising:

a safety strobe light comprising:
  a lamp comprising a lamp base;
  an attachment base comprising an attachment means;
  a magnetic body portion comprising an upper neck opposite a lower neck, an upper flange opposite a lower flange, and defining a channel between the upper flange and lower flange, the channel encircling the body portion;
    wherein the upper neck defines a lamp recess constructed and arranged to receive and magnetically connect to the lamp base;
    wherein the lower neck defines an attachment base recess constructed and arranged to receive and magnetically connect to at least a portion of the attachment base;

an attachment and removal tool comprising:
  a tool body includes a first arm and a second arm extending therefrom, the tool body, first arm, and second arm defining a channel slot and channel seat, and wherein the channel slot and channel seat are constructed and arranged to slidably receive the channel defined by the body portion such that the safety strobe light is removably secured within the tool body; and
  a pivoting neck attached to the tool body, the pivoting neck constructed and arranged to attach the attachment and removal tool to a pole.

19. The modular safety strobe light and attachment and removal tool as in claim 18, wherein the attachment base comprises a magnet.

20. The modular safety strobe light and attachment and removal tool as in claim 18, wherein the lamp comprises at least one light emitting diode.

\* \* \* \* \*